March 10, 1970  W. A. TALLEY, JR  3,499,266
MARINE OIL-GAS SEPARATOR
Filed Nov. 13, 1968  2 Sheets-Sheet 1

United States Patent Office 3,499,266
Patented Mar. 10, 1970

3,499,266
MARINE OIL-GAS SEPARATOR
William A. Talley, Jr., Dallas, Tex., assignor to Mobil Oil
Corporation, a corporation of New York
Filed Nov. 13, 1968, Ser. No. 775,235
Int. Cl. B01d 19/00
U.S. Cl. 55—169                           7 Claims

ABSTRACT OF THE DISCLOSURE

The specification discloses a system for producing, separating, and storing submarine oil and gas. The system includes a floating storage vessel having a ship-shaped hull which is moored to a buoy so that it is free to pivot through 360° in response to the combined forces of wind and water. Produced fluids are directed from an underwater location through a swivel joint on the buoy and a floating hose to the storage tanks of the floating vessel. Mounted in the buoy is a unique oil-gas separator which comprises a rigid standpipe surrounded by a main pressure vessel. An inlet conduit intersects the rigid standpipe in the main pressure vessel at right angles, thus providing a pair of fluid inlets, one of which is always above the sump fluid. Separated oil is directed through a swivel joint concentric with the top of the standpipe, while separated gas is flared through an upward extension of the standpipe.

BACKGROUND OF THE INVENTION

The invention described herein relates generally to the production and storage of fluid minerals, such as oil and gas, underlying a body of water; and, more specifically, to novel separation equipment for dividing a fluid into its oil and gas components.

While it has other applications, the present invention is particularly suited for use in conjunction with the system disclosed in the copending application of Lewis A. Rupp, Ser. No. 770,350, filed Nov. 13, 1968, and entitled Floating Storage System With Buoy-Mounted Separator. The described system is an improved floating storage system which includes a storage vessel moored to a buoy. The buoy includes an oil-gas separator unit and an oil swivel joint. A floating hose extends from the oil swivel joint on the buoy to the storage tanks of the floating tanker. In response to wind and water forces, the storage vessel is free to pivot about the buoy. The separation and reduction of the produced fluid to atmospheric pressure is accomplished in the buoy, prior to being directed through the swivel joint, whereby mechanical seal pressures and other problems are obviated.

Rigid requirements are placed on oil-gas separators to be used in marine environments, particularly where there is a lot of pitch and roll caused by wave action. Such separators must be structurally strong and adaptable to unstable mounting. When ordinary oil-gas separators are used in marine operations, such as above described, a great deal of roll and pitch will cause the inlet conduit of the separator to become submerged in oil so that oil will blow through the flare stack with separated gas.

SUMMARY OF THE INVENTION

The present invention provides a novel liquid-gas separator unit to be used in marine environments. The separator unit includes a rigid standpipe around which the other separator equipment is clustered. Mounted centrally about the rigid standpipe is a main pressure vessel. An inlet conduit within the main pressure vessel intersects the rigid standpipe at a perpendicular angle, thus providing a pair of fluid inlets. The rigid standpipe extends above the main pressure vessel, the upper portion above the inlet conduit being used to draw off the separated-out gas. Gas may be flared at the upper end of the rigid standpipe through a flare stack. The upper end of the standpipe is enclosed with an outer concentric pipe through which liquids are drawn off. Surrounding the outer pipe is a rotatable yoke forming a swivel joint.

As a unique feature of the present invention, the pair of inlets provided by the inlet conduit always remains above the surface of the sump fluid. By having two fluid inlets, the liquid-gas mixture is broken up and surge shocks are lessened, thereby obviating the need for auxiliary surge vessels. The rigid standpipe is the key to the provision of an integral and strong separator structure. The unique continuous design of the rigid standpipe extending from under the separator to the flare mist provides enough rigidity for the flare stack to eliminate the need for the usual supporting tower. Another unique feature is that the liquid-gas mixture is divided toward both ends of the separator by the inlet conduit, giving increased separator capacity for unit size, lower surge problems, and less problems with unbalanced fluid levels due to wave action on the separator.

DETAILED DESCRIPTION OF FIGURE 1

Figure 1:
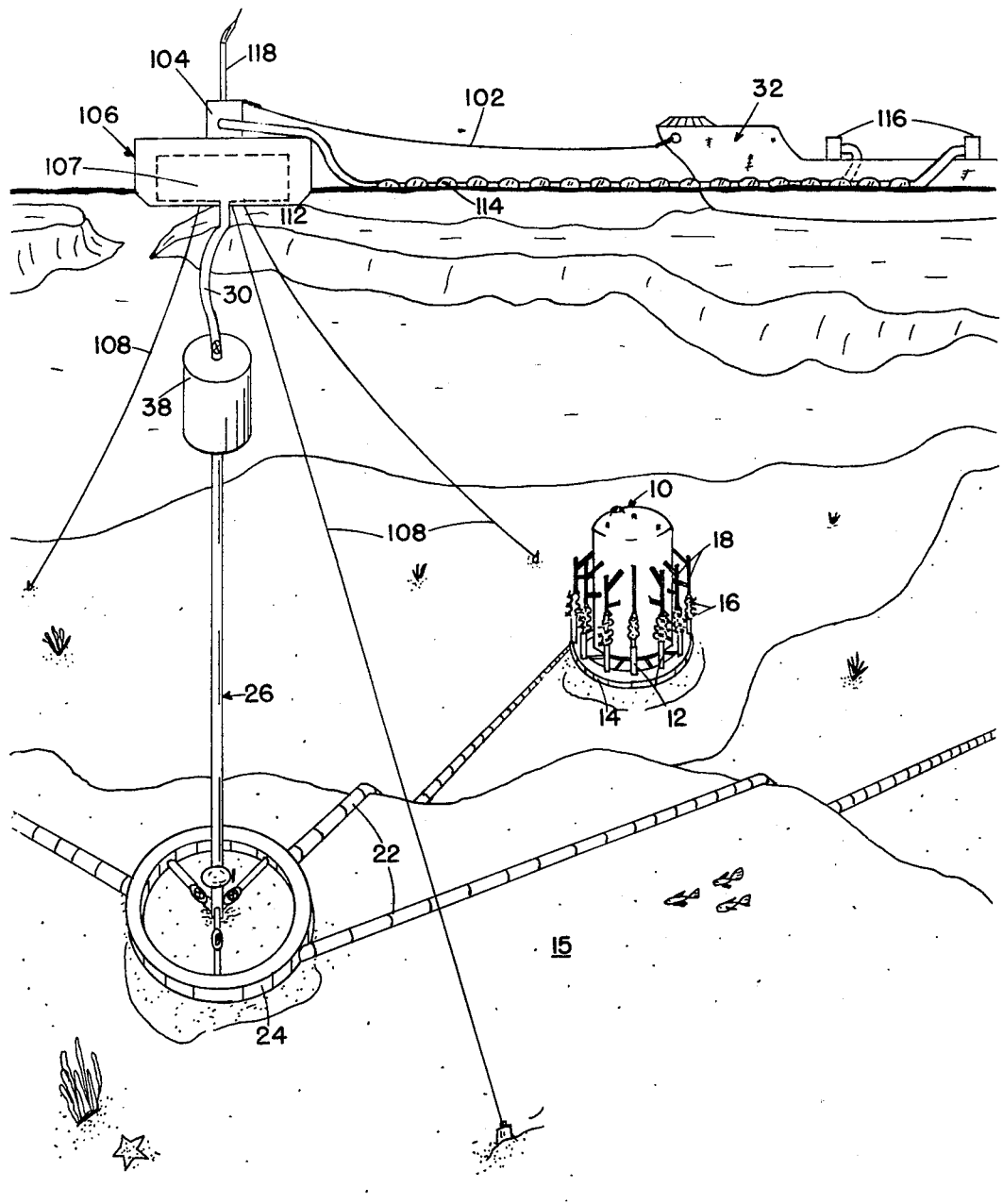
FIGURE 1 is a schematic illustration of a floating storage system moored to a buoy to which this invention is particularly applicable.

Referring to FIGURE 1, a surface storage system is illustrated utilizing a number of underwater satellite gathering stations, each having a series of wells drilled through standing conductor pipes 12 of a template ring 14 resting on the marine bottom 15. The wells are completed with underwater wellheads 16 mounted atop the conductor pipes 12 and in turn capped with connector units 18 for directing the produced fluid from the wellheads into the interior of satellite stations 10. The apparatus and method of installation of such an underwater satellite station are described in the copending application of William A. Talley, Jr., Ser. No. 740,520, filed June 27, 1968, and entitled Subsea Production Station.

The produced outputs of all of the satellite gathering stations are connected through shipping lines 22 to a circular manifold 24 located on the marine bottom 15 concentric with a tether pipe 26. Produced fluids are transported through tether pipe 26 from the marine bottom to an intermediate point several hundred feet below the water surface, where the tether pipe terminates in a buoyant chamber 38. A flexible connection 30 extends from the upper end of tether pipe 26 to a mooring buoy 106. Mooring lines 108 extend between anchor points 110 on the marine bottom to the mooring buoy 106. A separator unit 107 is shown schematically as being mounted in the hollow interior of buoy 106. Separator unit 107 is designed to separate the production flow into its liquid and gaseous components, usually into its oil and gas components. A swivel 104 is mounted atop buoy 106. A floating storage structure 32, having a ship-shaped hull, is moored by means of mooring lines 102 to the swivel 104. The floating storage structure 32 is free to pivot about the buoy 106 on its mooring line 102 in response to combined wind and water forces.

A floating hose 114 extends from an oil outlet port of swivel 104 to the storage manifolds 116 on the floating storage structure 32. A central gas flare stack 118 extends upward concentrically through the swivel 104 for burning off the separated-out gas.

By mounting separator 107 in the buoy 106, a low pressure oil is delivered to the storage facility on the structure 32 and high pressure seals are obviated in the swivel 104.

DETAILED DESCRIPTION OF FIGURE 2

Figure 2:
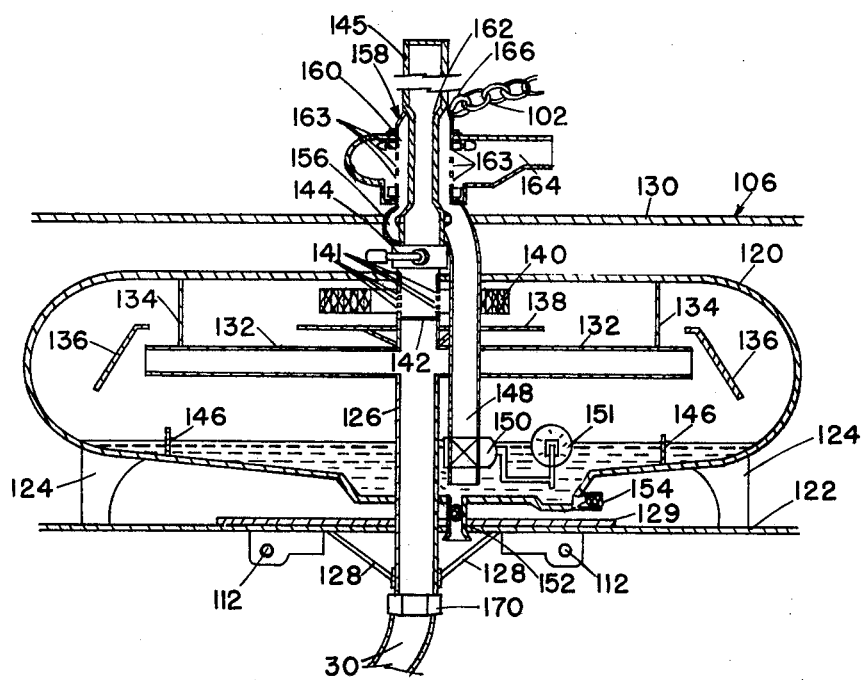
FIGURE 2 is a side elevation partially in cross section of an example separator according to the present invention.

Referring to FIGURE 2, there will now be described an example of the separator unit according to the present invention which can be used in the mooring buoy 106 of FIGURE 1.

As illustrated in FIGURE 2, the separator unit includes a main pressure vessel 120 which is elongated or cigar shaped with its longest dimension extending horizontally. The main pressure vessel 120 rests on a lower bulkhead or deck 122 of the buoy 106 on integral legs 124. A rigid standpipe 126 extends fully through the pressure vessel 120, depending through the lower deck 122 from which it obtains its primary support. Standpipe 126 is rigidly connected to the lower deck 122 by means of angularly spaced diagonal struts 128. The lower end of standpipe 126 is welded directly to the lower face of deck 122 and to the upper face of a supporting plate 129, which rests on the deck 122. The standpipe 126 extends through the main pressure vessel 120 and the upper deck 130 of the buoy.

An inlet conduit 132 within the main pressure vessel 120 intersects the standpipe 126 at a perpendicular angle thus providing a pair of fluid inlets. Conduit 132 is supported by straps 134 extending downward from the upper interior wall of the pressure vessel 120. Inlet deflectors 136 are mounted in the interior of pressure vessel 120 radially downward of each end of conduit 132. A circular secondary deflector 138 is mounted concentrically on the standpipe 126 between the conduit 132 and a mist extractor 140.

Radial ports 141 are formed through the standpipe 126 within mist extractor 140. A plate 142 closes off the standpipe 126 just below the mist extractor 140.

A gas pressure valve and float assembly 144 is mounted within the standpipe 126 above pressure vessel 120 but beneath the upper deck 130 of buoy 106. Stilling baffles 146 are mounted in the sump of pressure vessel 120 as is the inlet of a discharge line 148. The entrance of liquid into the discharge line 148 is regulated by a float-controlled valve arrangement 150 including a float 151 mounted in the lower end of discharge line 148. A valved drain 152 is connected to a depressed central portion of pressure vessel 120 to direct water and other impurities from the lower end of pressure vessel 120 directly into the water beneath buoy 106. A second valved drain 154 is provided for draining the fluid from the sump of pressure vessel 120 into the hollow interior of buoy 106.

The liquid discharge line 148 is connected at its upper end to a circular manifold 156 which is mounted concentrically around the gas flare stack 145. An oil swivel 158 is located concentrically about flare stack 145 just above manifold 156 with which the oil swivel is in fluid communication. Oil swivel 158 comprises an outer stationary pipe element 160 which nests concentrically in a necked down portion 162 of pipe element 126. The pipe element 160 has radial ports 163 providing fluid communication between the interior of pipe element 160 and the interior of an outer rotatable yoke portion 164 of the swivel 158. The outer end of the yoke portion 164 is coupled to the end of the floating hose 114 shown in FIGURE 1.

At least one padeye 166 is mounted on the upper end of rotatable yoke portion 164 of the oil swivel 158 for connecting one end of the mooring line 102 which is used for mooring the floating storage structure 32 shown in FIGURE 1 to buoy 106.

In use the separator unit of FIGURE 2 is connected to a source of produced fluid such as through flexible connection 30 extending from the upper end of tether pipe 26 as described with respect to FIGURE 1. The upper end of flexible hose 30 is connected to the lower end of the rigid standpipe 126 by means of a fluidtight connector 170.

The unique continuous design of standpipe 126 from under the buoy 106 to the flare stack 145 above buoy 106 provides for rigidity and eliminates the need for a supporting tower.

By means of the inlet conduit 132 the incoming oil-gas mixture is directed in two streams toward each end of the main pressure vessel 120, thus providing increased separation capacity per unit volume of the main pressure vessel 120, lower surge problems, and less problems with the unbalanced fluid levels due to wave action on the buoy. This permits the separator to function properly even when the buoy 106 is at a considerable angle to the horizontal. With a conventional oil and gas separator mounted in buoy 106 when the buoy was inclined at an acute angle, oil would be forced through the mist extractor and out through the flare stack. This cannot happen with the present invention, where at least one of the conduits 132 is always above the oil level in the sump.

While the main pressure vessel 120 is described above as being cigar shaped, it can also be an oblate spheroid. In such an instance there could be more than one inlet conduit 132. In fact, there could be several conduits spaced at equal angles about the axis of standpipe 126 and preferably located in a plane.

The invention claimed is:
1. A liquid-gas separator comprising:
  (a) a rigid standpipe;
  (b) a main pressure vessel centrally surrounding said standpipe;
  (c) a conduit intersecting said standpipe within said main pressure vessel and providing a pair of fluid inlets from said standpipe into said pressure vessel;
  (d) a swivel assembly including a liquid outlet mounted concentrically about said standpipe above said pressure vessel;
  (e) a liquid discharge line extending from within the lower portion of said pressure vessel through the wall of said pressure vessel and in fluid communication with the interior of said swivel assembly; and
  (f) a float-controlled valve located in the lower end of said discharge line whereby liquid is permitted to flow through said discharge line and through the outlet of said swivel.

2. The separator defined by claim 1 further comprising:
  (a) a mist extractor concentrically surrounding said standpipe between said conduit and the upper wall of said pressure vessel; and
  (b) blocking means to block fluid in said standpipe between said mist extractor and said conduit, said standpipe having ports formed in the wall thereof within said mist extractor whereby gas effluent from said pressure vessel may flow through said mist extractor and thence through said rigid standpipe.

3. The separator defined by claim 1 wherein said swivel assembly comprises:
  (a) a pipe element mounted concentrically about a reduced diameter portion of said rigid standpipe, said concentric pipe elements having ports formed in the walls thereof; and
  (b) a yoke portion surrounding said concentric pipe element adjacent said ports and having an outlet pipe, said yoke portion being free to swivel about said concentric pipe element through 360° whereby liquid flowing through said discharge line may pass through the ports in said concentric pipe element and through the outlet pipe of said yoke portion.

4. The system defined by claim 3 further including a pair of deflectors located adjacent each end of said conduit in said pressure vessel and angularly positioned to deflect fluid downwardly into said pressure vessel.

5. The separator unit defined by claim 4 wherein said main pressure vessel is located within a hollow portion of a buoy and said rigid standpipe is mounted vertically during normal use.

6. The separator defined by claim 5 wherein the lower end of said rigid standpipe extends through the lower wall of said buoy for connection to a liquid-gas mixture.

7. The separator defined by claim 5 further including in said main pressure vessel a valved drain extending from the lower portion of said main pressure vessel through the bottom wall of said buoy.

References Cited

UNITED STATES PATENTS

| | | | |
|---|---|---|---|
| 1,573,439 | 2/1926 | Bedford | 285—272 |
| 2,861,647 | 11/1958 | Musslewhite | 55—169 |
| 3,292,695 | 12/1966 | Haeber | 166—.5 |

REUBEN FRIEDMAN, Primary Examiner

R. W. BURKS, Assistant Examiner

PO-1050
(5/69)

UNITED STATES PATENT OFFICE
CERTIFICATE OF CORRECTION

Patent No. 3,499,266      Dated March 10, 1970

Inventor(s) William A. Talley, Jr.

It is certified that error appears in the above-identified patent and that said Letters Patent are hereby corrected as shown below:

Column 1, line 40, the Serial No. "770,350" should read -- 775,350 --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents